(12) United States Patent
Nair

(10) Patent No.: US 11,680,600 B2
(45) Date of Patent: Jun. 20, 2023

(54) SUCTION APPARATUS FOR IMMOBILITY IN FREE FALL

(71) Applicant: Hamilton Sundstrand Corporation, Charlotte, NC (US)

(72) Inventor: Rashmitha Ramesh Nair, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 158 days.

(21) Appl. No.: 17/159,280

(22) Filed: Jan. 27, 2021

(65) Prior Publication Data
US 2022/0025921 A1    Jan. 27, 2022

(30) Foreign Application Priority Data
Jul. 24, 2020  (IN) .............................. 202011031722

(51) Int. Cl.
*F16B 47/00*     (2006.01)
*A43B 13/14*     (2006.01)
*A43C 15/02*     (2006.01)

(52) U.S. Cl.
CPC .............. *F16B 47/00* (2013.01); *A43B 13/14* (2013.01); *A43C 15/02* (2013.01)

(58) Field of Classification Search
CPC . F16B 47/00; A43B 13/14; A43B 3/40; A43B 3/48; A43C 15/02; B64G 1/60; B64G 6/00
USPC ...................................................... 248/205.9
See application file for complete search history.

(56) References Cited

U.S. PATENT DOCUMENTS

| | | | |
|---|---|---|---|
| 1,389,416 A | 8/1921 | Zertuche | |
| 1,634,196 A * | 6/1927 | Jones | B21D 43/22 144/242.1 |
| 3,347,327 A * | 10/1967 | Albert | B65G 47/91 177/208 |
| 4,118,878 A | 10/1978 | Semon | |
| 4,674,200 A | 6/1987 | Sing | |
| 6,470,600 B1 | 10/2002 | Louie | |
| 7,712,229 B2 | 5/2010 | Yang | |

(Continued)

FOREIGN PATENT DOCUMENTS

WO    2009079893 A1    7/2009

OTHER PUBLICATIONS

European Search Report for European Application No. 21187264.3; dated Dec. 21, 2021; 68 pages.

(Continued)

*Primary Examiner* — Muhammad Ijaz
(74) *Attorney, Agent, or Firm* — Cantor Colburn LLP

(57) ABSTRACT

An immobility system for a free-fall environment includes an immobility device including at least one suction cup configured to engage the immobility device to a surface, and a valve that, when activated, results in release of the at least one suction cup from engagement with the surface. A remote controller is spaced apart from the valve and is configured to selectably transmit an activation signal to the valve. An immobility device includes at least one suction cup configured to engage the immobility device to a surface, and a valve that, when activated, results in release of the at least one suction cup from engagement with the surface. A receiver at the device is configured to receive an activation signal and activate the valve.

18 Claims, 4 Drawing Sheets

(56) References Cited

U.S. PATENT DOCUMENTS

| | | |
|---|---|---|
| 11,346,389 B2* | 5/2022 | Chen ..................... F16B 47/00 |
| 2016/0128399 A1 | 5/2016 | Giulianotti et al. |
| 2019/0063488 A1* | 2/2019 | Becker .................. F16B 47/00 |
| 2022/0104582 A1* | 4/2022 | Christensen ......... A43B 23/029 |

OTHER PUBLICATIONS

Vacuum-powered suction pads enable wall-climbing; CBC News; Posted Jun. 13, 2021; 2 pages.

\* cited by examiner

SUCTION APPARATUS FOR IMMOBILITY IN FREE FALL

CROSS-REFERENCE TO RELATED APPLICATIONS

This application claims the benefit of IN Provisional Application No. 202011031722 filed Jul. 24, 2020, the disclosure of which is incorporated herein by reference in its entirety.

BACKGROUND

Exemplary embodiments pertain to the art of immobility devices, and in particular to immobility devices suitable for use in orbital or other freefall conditions.

In orbital situations of craft such as, for example, the International Space Station, the speed of travel necessary to maintain orbit results in the personnel in or on the craft experiencing free fall conditions and a feeling of weightlessness.

Typically, in order to remain stationary for certain tasks, the personal are strapped to a fixed structure of the craft or utilize other structures such as fixed foot loops to stabilize their position and stop or reduce movement about the craft as needed. Straps are often difficult to wear and may cause conditions such as calluses. Further, foot loops may not be able to provide complete immobility for experiments or other work that require precision and accuracy.

BRIEF DESCRIPTION

In one embodiment, an immobility system for a free-fall environment includes an immobility device including at least one suction cup configured to engage the immobility device to a surface, and a valve that, when activated, results in release of the at least one suction cup from engagement with the surface. A remote controller is spaced apart from the valve and is configured to selectably transmit an activation signal to the valve.

Additionally or alternatively in this or other embodiments an air passage extends from the at least one suction cup. The air passage includes an air inlet opening. The valve includes a valve piston movable from a deactivated position in which the valve piston blocks the air passage between the air inlet and the at least one suction cup, and an activated position at which the valve piston does not block the air passage thereby allowing an airflow through the air passage to the at least one suction cup.

Additionally or alternatively in this or other embodiments the valve is a solenoid valve.

Additionally or alternatively in this or other embodiments a battery is located at the immobility device and operably connected to the valve.

Additionally or alternatively in this or other embodiments a receiver is located at the immobility device and is operably connected to the valve. A transmitter is located in the remote controller and wirelessly connected to the receiver. The receiver receives the activation signal from the transmitter and activates operation of the valve.

Additionally or alternatively in this or other embodiments the transmitter communicates with the receiver via Bluetooth®.

Additionally or alternatively in this or other embodiments the immobility device is a shoe.

Additionally or alternatively in this or other embodiments the at least one suction cup is located at a sole of the shoe.

Additionally or alternatively in this or other embodiments the at least one suction cup is connected to an air inlet via at least one air passage extending through the sole.

Additionally or alternatively in this or other embodiments the immobility device is one of an arm sleeve or a knee sleeve.

Additionally or alternatively in this or other embodiments the remote controller includes one or more sensors that detect operator movement and transmit the activation signal.

In another embodiment, an immobility device includes at least one suction cup configured to engage the immobility device to a surface, and a valve that, when activated, results in release of the at least one suction cup from engagement with the surface. A receiver at the device is configured to receive an activation signal and activate the valve.

Additionally or alternatively in this or other embodiments an air passage extends from the at least one suction cup. The air passage includes an air inlet opening. The valve includes a valve piston movable from a deactivated position in which the valve piston blocks the air passage between the air inlet and the at least one suction cup, and an activated position at which the valve piston does not block the air passage thereby allowing an airflow through the air passage to the at least one suction cup.

Additionally or alternatively in this or other embodiments the valve is a solenoid valve.

Additionally or alternatively in this or other embodiments a battery is operably connected to the valve.

Additionally or alternatively in this or other embodiments the receiver receives the activation signal wirelessly.

Additionally or alternatively in this or other embodiments the immobility device is a shoe.

Additionally or alternatively in this or other embodiments the at least one suction cup is located at a sole of the shoe.

Additionally or alternatively in this or other embodiments the at least one suction cup is connected to an air inlet via at least one air passage extending through the sole.

Additionally or alternatively in this or other embodiments the immobility device is one of an arm sleeve or a knee sleeve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
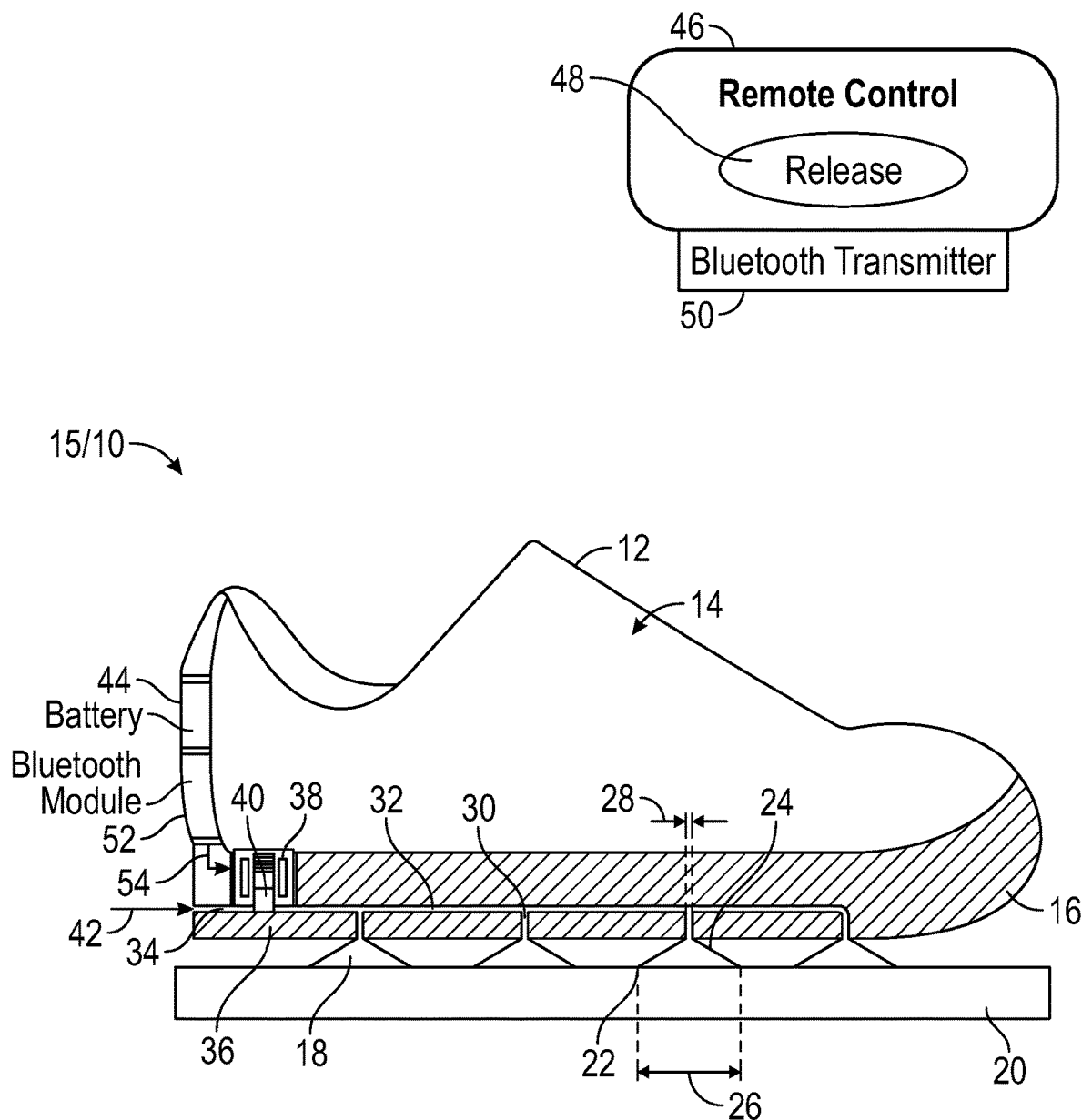
FIG. 1 is a schematic illustration of an embodiment of an immobility device engaged to a surface.

Referring to FIG. 1, illustrated is an embodiment of an immobility device 15, such as shoe 10. While FIG. 1 shows the exemplary embodiment of the immobility device 15 as the shoe 10, one skilled in the art will readily appreciate that the immobility devices 15 described herein may be utilized at other parts of the body, such as a hand, wrist, or knee, as further discussed with reference to FIG. 4, for example.

The shoe 10 includes a shoe body 12 having an upper 14 and a sole 16. A plurality of suction cups 18, such as four suction cups 18 are located at the sole 16. The suction cups 18 are formed from a compliant material, such as a rubber or plastic material, to engage a surface 20 such as a floor, wall or the like. Each suction cup 18 has a first end 22 configured to engage the surface 20, and a second end 24 opposite the first end 22. In some embodiments, the first end 22 is circular and has a first diameter 26. Similarly, the second end 24 is circular and has a second diameter 28 smaller than the first diameter 26. A cup air passage 30 extends from the suction cup 18 into the sole 16, and is connected to a main air passage 32, which extends along the sole 16 to an air inlet 34 located at, for example, a heel portion 36 of the sole 16.

A solenoid valve 38 is located in the sole 16 and includes a valve piston 40 that, under normal conditions, extends across the main air passage 32 preventing air flow 42 entering the air inlet 34 from reaching the suction cups 18. In some embodiments, the solenoid valve 38 is located between the air inlet 34 and a first suction cup 18 positioned along the main air passage 32 closest to the air inlet 34.

The solenoid valve 38 is connected to and powered by a battery 44. Operation of the solenoid valve 38 is controlled by a remote controller 46 utilized by the operator. The remote controller 46 may include a release button 48, or the like, and a transmitter 50, such as a Bluetooth® transmitter, which communicates with a controller 52, such as a Bluetooth® module located in the shoe 10, in some embodiments in the sole 16. In some embodiments, the transmitter 50 communicates with the controller 52 wirelessly. While a Bluetooth® connection is discussed herein, one skilled in the art will readily appreciate that such a connection is merely exemplary, and that any suitable wireless connection between the remote controller 46 and the controller 52 at the shoe 10 may be utilized. The controller 52 communicates an activation signal 54 to energize the solenoid valve 38 via the battery 44. As shown in FIG. 1, the solenoid valve 38 is normally in a closed position, in which the valve piston 40 extends across the main air passage 32. When the shoe 10 is pressed against the surface 20, the gas is the suction cups 18 is squeezed out, and since the air inlet 34 is blocked due to the closed solenoid valve 38, the suction cup 18 can hold to the surface 20 tightly to prevent movement.

Figure 2:
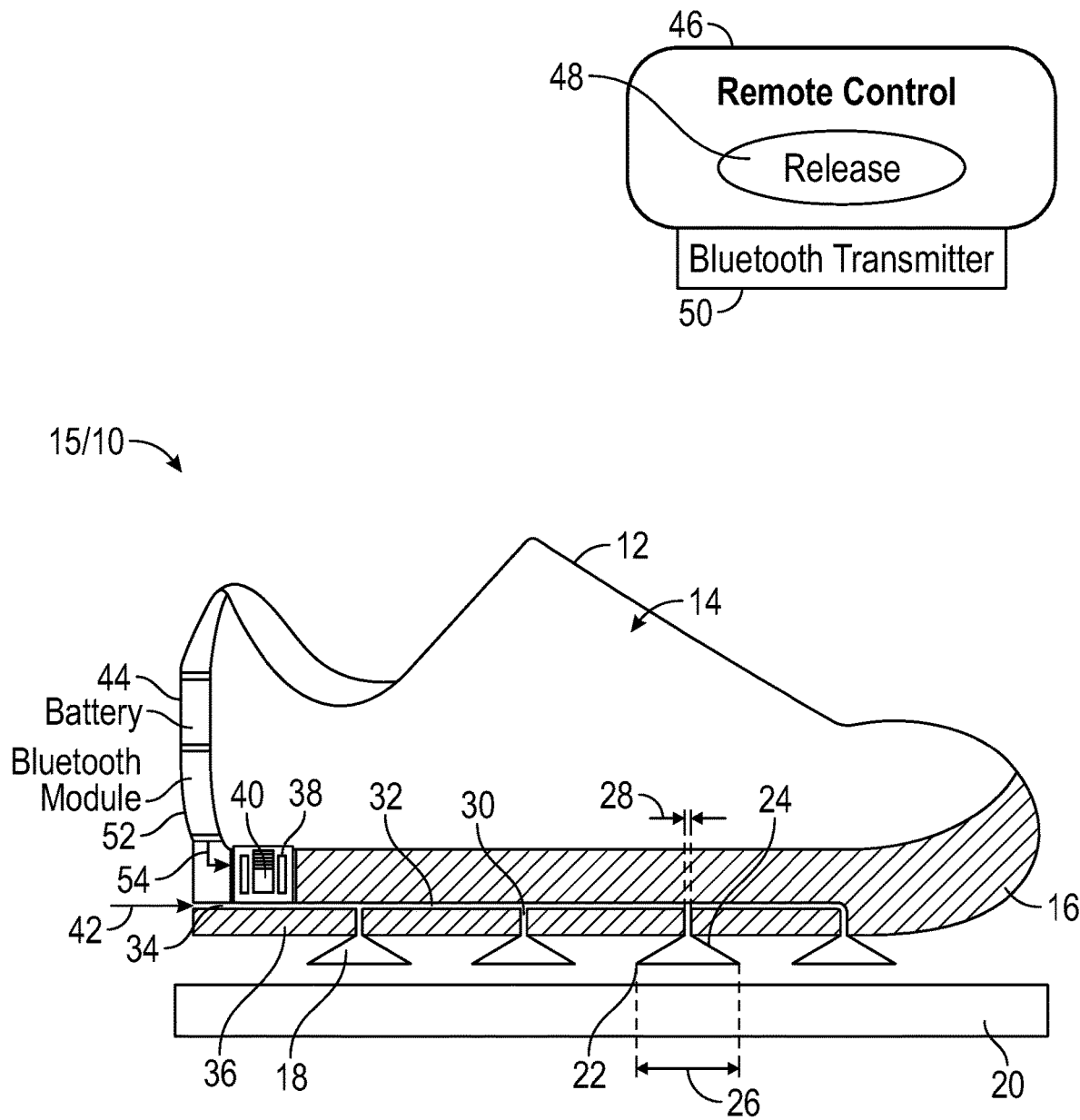
FIG. 2 is a schematic illustration of an embodiment of an immobility device disengaged from a surface.

Referring to FIG. 2, when the operator needs to move, the release button 48 is activated and the solenoid valve 38 is energized, thus retracting the valve piston 40 from the main air passage 32. This allows the air flow 42 into the main air passage 32 via the air inlet 34 and into the suction cups 18. The suction cups 18 can then be easily separated from the surface 20, thus allowing the operator to move.

Figure 3:
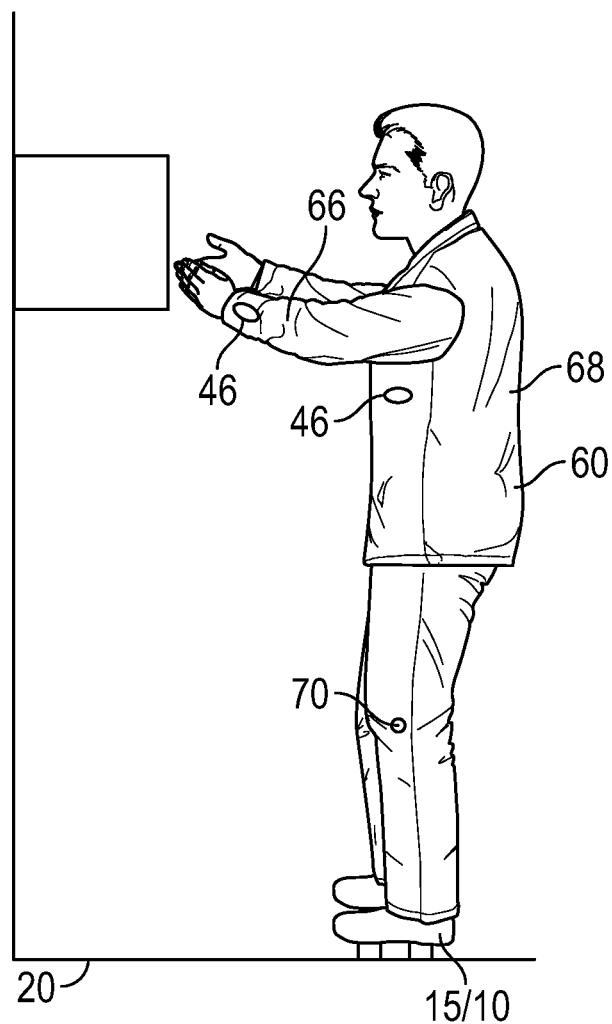
FIG. 3 is a schematic illustration of an operator utilizing an immobility device.
Figure 4:
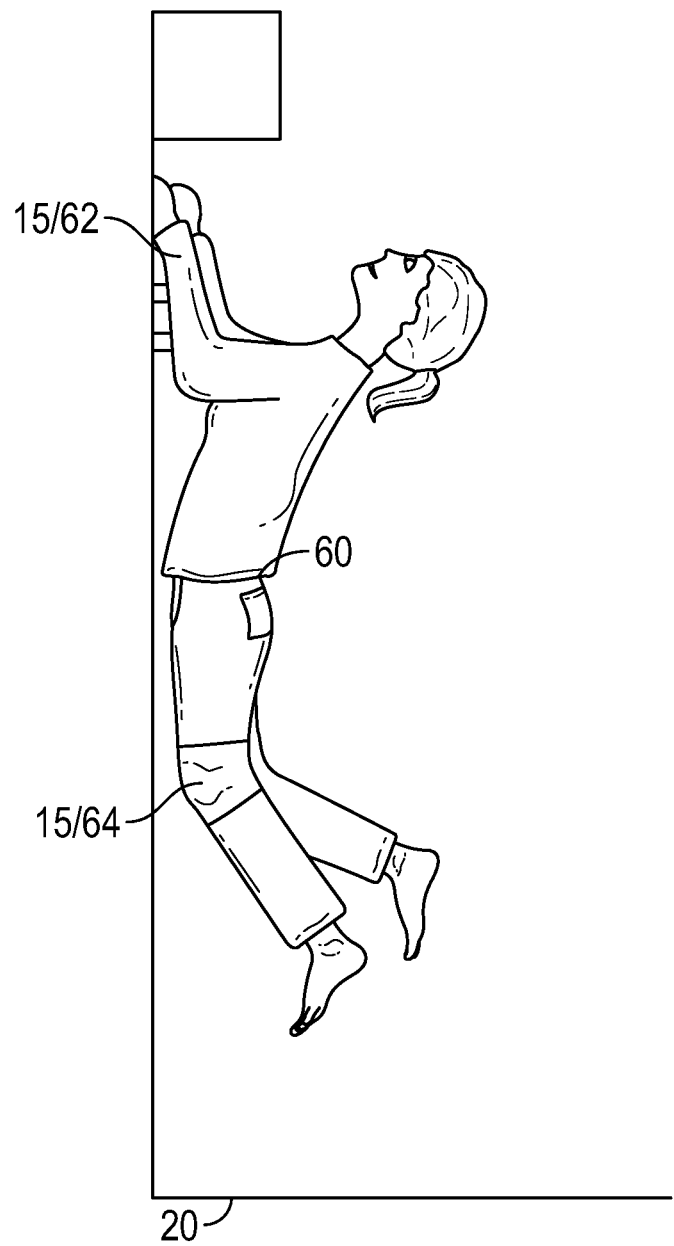
FIG. 4 is another schematic illustration of an operator utilizing an immobility device.

Referring to FIGS. 3 and 4, shown are different locations on an operator 60 where the immobility device 15 may be utilized. In FIG. 3, the immobility device 15 is the shoe 10. In other embodiments, such as shown in FIG. 4, the immobility device 15 may be utilized as an arm sleeve 62 or, for example, a knee sleeve 64. Further, the remote controller 46 may be hand held, or may further be secured to the operator 60 at, for example, the forearm 66, torso 68 or the like. In still other embodiments, the remote controller 46 may employ one or more sensors 70 that detect operator 60 movement, such as, for example, lifting the leg, double tap using toes, or the like, which transmits the activation signal resulting in opening of the solenoid valve 38.

The immobility devices 15 disclosed herein are remote controlled, thereby easy to utilize, and allow for the elimination of typically used foot loops and straps in free-fall environments. Further, this enables utilization of the immobility device 15 at any needed location, even locations where foot loops or straps typically not installed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An immobility system for a free-fall environment, comprising:
    an immobility device, comprising:
    at least one suction cup configured to engage the immobility device to a surface;
    a valve that, when activated, results in release of the at least one suction cup from engagement with the surface; and
    a remote controller spaced apart from the valve, configured to selectably transmit an activation signal to the valve;
    wherein the remote controller includes one or more sensors that detect operator movement and transmit the activation signal.

2. The immobility system of claim 1, further comprising an air passage extending from the at least one suction cup, the air passage including an air inlet opening;
    wherein the valve includes a valve piston movable from a deactivated position in which the valve piston blocks the air passage between the air inlet opening and the at least one suction cup, and an activated position at which the valve piston does not block the air passage thereby allowing an airflow through the air passage to the at least one suction cup.

3. The immobility system of claim 2, wherein the valve is a solenoid valve.

4. The immobility system of claim 2, further comprising a battery disposed at the immobility device and operably connected to the valve.

5. The immobility system of claim 1, further comprising:
a receiver disposed at the immobility device and operably connected to the valve; and
a transmitter disposed in the remote controller and wirelessly connected to the receiver;
wherein the receiver receives the activation signal from the transmitter and activates operation of the valve.

6. The immobility system of claim 5, wherein the transmitter communicates with the receiver via Bluetooth®.

7. The immobility system of claim 1, wherein the immobility device is a shoe.

8. The immobility system of claim 7, wherein the at least one suction cup is disposed at a sole of the shoe.

9. The immobility system of claim 8, wherein the at least one suction cup is connected to an air inlet via at least one air passage extending through the sole.

10. The immobility system of claim 1, wherein the immobility device is one of an arm sleeve or a knee sleeve.

11. An immobility device, comprising:
at least one suction cup configured to engage the immobility device to a surface;
a valve that, when activated, results in release of the at least one suction cup from engagement with the surface;
a receiver configured to receive an activation signal and activate the valve; and
an air passage extending from the at least one suction cup, the air passage including an air inlet opening;
wherein the valve includes a valve piston movable from a deactivated position in which the valve piston blocks the air passage between the air inlet opening and the at least one suction cup, and an activated position at which the valve piston does not block the air passage thereby allowing an airflow through the air passage to the at least one suction cup.

12. The immobility device of claim 11, wherein the valve is a solenoid valve.

13. The immobility device of claim 11, further comprising a battery operably connected to the valve.

14. The immobility device of claim 11, wherein the receiver receives the activation signal wirelessly.

15. The immobility device of claim 11, wherein the immobility device is a shoe.

16. The immobility device of claim 15, wherein the at least one suction cup is disposed at a sole of the shoe.

17. The immobility device of claim 16, wherein the at least one suction cup is connected to an air inlet via at least one air passage extending through the sole.

18. The immobility system of claim 11, wherein the immobility device is one of an arm sleeve or a knee sleeve.

\* \* \* \* \*